US010925145B2

(12) United States Patent
Sangermano et al.

(10) Patent No.: US 10,925,145 B2
(45) Date of Patent: Feb. 16, 2021

(54) DEVICE FOR GENERATING COMPRESSED FLUIDS

(71) Applicants: Paolo Sangermano, Rome (IT); IFA INTERNATIONAL FLUID ASSOCIATION, Rome (IT)

(72) Inventors: Paolo Sangermano, Rome (IT); Ferdinando Smorra, Portici (IT); Domenico Cirillo, Caserta (IT)

(73) Assignees: Paolo SANGERMANO, Rome (IT); IFA INTERNATIONAL FLUID ASSOCIATION, Rome (IT)

( * ) Notice: Subject to any disclaimer, the term of this patent is extended or adjusted under 35 U.S.C. 154(b) by 98 days.

(21) Appl. No.: 16/330,029

(22) PCT Filed: Aug. 25, 2017

(86) PCT No.: PCT/IB2017/001504
§ 371 (c)(1),
(2) Date: Mar. 1, 2019

(87) PCT Pub. No.: WO2018/042258
PCT Pub. Date: Mar. 8, 2018

(65) Prior Publication Data
US 2019/0208615 A1 Jul. 4, 2019

(30) Foreign Application Priority Data

Sep. 2, 2016 (IT) .................. 102016000089129

(51) Int. Cl.
*H05H 1/46* (2006.01)
*F03G 7/00* (2006.01)
*G21B 3/00* (2006.01)

(52) U.S. Cl.
CPC ............... *H05H 1/46* (2013.01); *F03G 7/00* (2013.01); *G21B 3/008* (2013.01); *H05H 2001/4645* (2013.01)

(58) Field of Classification Search
None
See application file for complete search history.

(56) References Cited

U.S. PATENT DOCUMENTS 3,925,990 A * 12/1975 Gross .................. G21B 1/00
376/146
4,333,796 A * 6/1982 Flynn .................. G21B 1/00
376/100

(Continued)

FOREIGN PATENT DOCUMENTS

| CN | 203 796 521 U | 8/2014 |
| WO | 03/005406 A1 | 1/2003 |
| WO | 2007/059012 A2 | 5/2007 |

OTHER PUBLICATIONS

International Search Report, dated Feb. 12, 2018, from corresponding PCT/IB2017/001504 application.

*Primary Examiner* — Amy Cohen Johnson
*Assistant Examiner* — Srinivas Sathiraju
(74) *Attorney, Agent, or Firm* — Nixon & Vanderhye

(57) ABSTRACT

A device for generating compressed fluids includes a first process chamber for a first reaction material; a second process chamber for a second reaction material; a third process chamber for a fluid intended for compression; a unit for determining the nebulization and the consequent inlet of the first reaction material into process chamber; a unit intended for determining the emission of radio waves with variable frequencies in the direction of the process chamber, where the radio waves emitted by the unit interact with the first and second reaction material contained in third process chamber, for producing a high-energy plasma warms and (Continued)

thereby compresses the fluid contained in second process chamber.

15 Claims, 1 Drawing Sheet

(56) References Cited

U.S. PATENT DOCUMENTS

| | | | | |
|---|---|---|---|---|
| 7,446,289 B2* | 11/2008 | Staton | ............... | H05H 1/46 156/345.28 |
| 8,488,734 B2* | 7/2013 | Ahlfeld | ............... | G21C 1/026 376/456 |
| 8,537,958 B2* | 9/2013 | Laberge | ............... | G21B 1/057 376/133 |
| 8,712,005 B2* | 4/2014 | Ahlfeld | ............... | G21C 1/026 376/456 |
| 8,891,719 B2* | 11/2014 | Howard | ............... | G21B 3/006 376/133 |
| 8,929,505 B2* | 1/2015 | Ahlfeld | ............... | G21C 3/3213 376/456 |
| 9,269,462 B2* | 2/2016 | Ahlfeld | ............... | G21C 17/102 |
| 9,271,383 B2* | 2/2016 | Howard | ............... | H05H 1/54 |
| 9,424,955 B2* | 8/2016 | Laberge | ............... | G02B 1/057 |
| 9,721,677 B2* | 8/2017 | Ahlfeld | ............... | G21C 1/026 |
| 9,875,816 B2* | 1/2018 | Laberge | ............... | G21B 1/057 |
| 10,002,680 B2* | 6/2018 | Laberge | ............... | G10K 15/043 |
| 2001/0037770 A1* | 11/2001 | Otsubo | ............... | C23C 16/4405 118/723 I |
| 2009/0261080 A1* | 10/2009 | Cheron | ............... | H05H 1/54 219/121.36 |
| 2011/0142185 A1* | 6/2011 | Woodruff | ............... | H05H 3/06 376/121 |
| 2014/0239232 A1* | 8/2014 | Staton | ............... | G01N 31/12 252/373 |
| 2019/0186286 A1* | 6/2019 | Lowery | ............... | F02P 9/007 |
| 2019/0186369 A1* | 6/2019 | Lowery | ............... | F23R 3/002 |
| 2019/0186743 A1* | 6/2019 | Lowery | ............... | F02C 7/266 |
| 2019/0208615 A1* | 7/2019 | Sangermano | ............... | F03G 7/00 |
| 2019/0368422 A1* | 12/2019 | Lowery | ............... | F23R 3/002 |

* cited by examiner

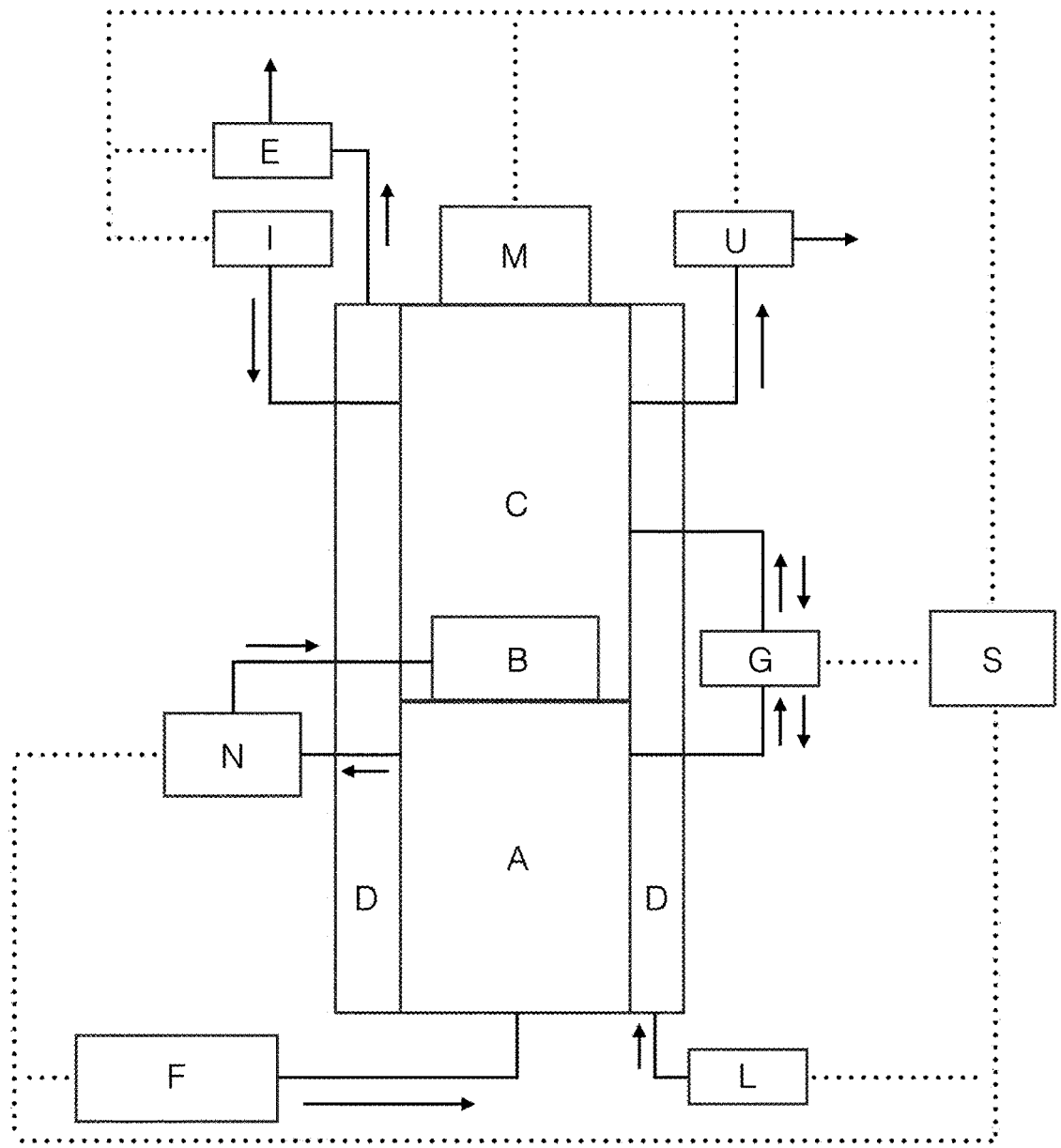

DEVICE FOR GENERATING COMPRESSED FLUIDS

BACKGROUND OF THE INVENTION

Field of the Invention

The present invention concerns the technical field of the systems for generating compressed fluids to be used in the realization of industrial processes and/or in the actuation of industrial equipment of different kind.

More in detail, the present invention concerns a device for generating compressed fluids to be used in the realization of industrial processes and/or in the actuation of industrial equipment by means of a high-energy plasma produced by the interaction of chemical elements with electron waves overexcited in radiofrequency.

Energy in its different forms undoubtedly is the fundamental resource in today's industrial society, as it is indispensable for performing many activities of primary importance in civil (lifting, moving and water heating processes for thermos-sanitary use) as well as in industrial field (production, device and motor operating, etc.).

Among the energy production systems used nowadays, those based on the use of high pressure fluids (in liquid or gaseous form) are widespread used for equipment for the generation for electric energy or driving force.

Description of the Related Art

Such systems for energy production are usually associated with systems for burning nonrenewable fossil material (as in piston motors, in endothermic turbines etc.) for generating and supplying high pressure fluids indispensable for their functioning.

Such energy production systems consequently determine a constant and harmful increase of noxious gases emitted into the atmosphere and a proportional and equally deleterious increase of environmental pollution due to toxic gases and/or fine dust.

BRIEF SUMMARY OF THE INVENTION

It is the aim of the present invention to overcome such important inconvenience of the present energy production systems based on the use of high pressure fluids by means of the realization of a device for the generation of compressed fluids to be used for the realization of industrial processes and/or in the actuation of industrial equipment, by means of a high energy plasma produced by the interaction of chemical elements with electron waves overexcited in radiofrequency.

The present invention meets the need of generating high pressure compressed fluids with small quantities of hydrocarbons and consequent small presence of noxious gases introduced into the atmosphere, with extremely reduced energy consumption and a greater generation efficiency with respect to the known art.

Furthermore, the present invention meets the need of generating high pressure compressed fluids with a device provided with a small number or mobile parts that undergo wear and therefore characterized in a greater operational reliability with respect to the known art.

BRIEF DESCRIPTION OF THE DRAWINGS

The present invention will be described herein below relating to one realization shown in the enclosed drawing, in which:

FIG. 1 schematically shows the structure and the general working principle of a device for generating compressed fluids, according to the present invention.

DETAILED DESCRIPTION OF THE PREFERRED EMBODIMENTS

Relating to the details of FIG. 1, a device for generating compressed fluids according to the present invention mainly comprises:

a first process chamber A for containing and further treating a first reaction material, associated with means F for the inlet therein of the first reaction material;

a second process chamber B for containing and further treating a second reaction material, associated to (not shown) inlet means of said second reaction material in the second process chamber B;

a third process chamber C for containing and further treating a fluid intended for compression, associated to means I, U for the inlet of said fluid intended for compression into the third process chamber C, and successive expulsion of said compressed fluid from the third process chamber;

means N, determining the nebulization and the consequent inlet of the second reaction material into process chamber B;

means M intended for determining the emission of radio waves with variable frequencies in the direction of the process chamber B;

an electronic control unit S that determines the coordinate working of above mentioned elements.

Relating now to the details of FIG. 1, a device for generating compressed fluids according to the present invention further comprises:

a fourth process chamber D for the eventual pre-heating of process chambers A and C, associated with means L, E for the inlet of a fluid for heating up the same and for the successive expulsion of said fluid from the same;

means G for determining the balance between process chambers A and C from eventual overpressure of the first reaction material or of the fluid intended for compression.

The first, second and third process chambers A, B and C comprise sealed containers, preferably but not exclusively of metal materials, respectively for a forte reaction material having liquid or gaseous form, for second reaction material having solid form and for a fluid intended for compression.

The fourth process chamber D comprises a sealed container, preferably but exclusively out of metal material, for a warming up fluid having liquid or gaseous form.

In a preferred embodiment of the device according to the present invention shown in FIG. 1, the first and third process chambers A and C are reciprocally adjacent; the second chamber B is embedded in the third process chamber C, and the first and third process chambers A and C are enclosed in the fourth process chamber D.

The first reaction material, contained and treated in the first process chamber A, comprises elements in liquid or gaseous form like water, demineralized water, fossil or biological hydrocarbons or similar, or compounds or emulsions comprising said elements.

The second reaction material contained and treated in the second process chamber B, comprises elements in solid shape, preferably but not exclusively out of metal, like cluster or copper, nickel, titanium, tungsten, iron, carbon or similar dusts, or compounds comprising said elements.

Said second reaction material is realized in the shape of tablets that may be placed in a special target area of the second process chamber B by means of inlet means (not shown) associated with the same, like loading doors or similar.

The fluid intended for compression, contained and treated in the third process chamber C, comprises elements in gaseous form like atmospheric air, carbon dioxide, helium, nitrogen or similar, or compounds comprising said elements.

The warming fluid contained in the fourth process chamber D, comprises thermal recovery fluids in liquid or gaseous form, deriving from industrial processes (thermal, chemical etc.) and/or from industrial equipment (burners, endothermic engines etc.) independent from the device according to the present invention.

Means F, I and L comprise adjusting valves and flow and pressure measurement counters of said first reaction material, of said fluid intended for compression and of said warming fluid, respectively introduced in the first, third, and fourth process chambers A, C and D.

Means U and E comprise adjusting valves and flow and pressure measurement counters of the compressed fluid and of the warming fluid, respectively discharged from the third and fourth process chambers C and D.

Means N comprise nebulization pumps of the peristaltic kind, or similar.

Means G comprise valves for compensation and/or overpressure discharge.

Means M comprise magnetron devices of the frequency variator kind, or similar.

The working principle of a device for generating compressed fluids according to the present invention may be described as follows.

Means F, operated by electronic control unit S, determine the inlet of the first reaction material—in liquid or gaseous form—in the first process chamber A of the device according to the present invention.

Means not shown, operated by electronic control unit S, determine the inlet of the second reaction material, in solid form, into the second process chamber B of the device according to the present invention.

Means I, operated by electronic control unit S, determine the inlet of the fluid intended for compression in the third process chamber C of the device according to the present invention.

Means N, operated by electronic control unit S, determine the nebulization and the consequent inlet of the first reaction material inside the second process chamber B.

Means M, operated by electronic control unit S, determine the emission of a radio wave at a specific frequency towards the second process chamber B, containing the first reaction material in nebulized form and the second reaction material in solid form.

The interaction between said reaction materials and said radio wave determines the triggering of a high-energy plasma in said second process chamber B, which determines a quick and high temperature increase of the fluid contained in the third process chamber C, a correspondent expansion of said fluid in said third chamber C and a consequent and advantageous compression of said fluid in said third chamber C.

The chemical-physical features and the reciprocal compatibilities of said first and second reaction materials, as well as the emission frequency of said radio wave are specifically chosen so as to obtain an optimal reciprocal interaction and a consequent optimal triggering of said high-energy plasma.

Means U, operated by electronic control unit S, determine the expulsion of the compressed fluid from the third process chamber C towards using equipment associated with the device according to the present invention, preferably but not exclusively of the kind of energy generating equipment or equipment actuating industrial processes of different kinds.

Electronic control unit S cyclically determines the reboot of the device according to the present invention, opening means I, closing means U and operating means M, synchronized in such a way as to obtain he compression of the fluid contained in said process chamber C at short and repeated rates of a frequency variable between 40 and 200 cycles per second (Hz).

For the optimum compression of the fluid contained in process chamber C, electronic control unit C operates means L for determining the possible inlet of a warming fluid in the fourth process chamber D and a consequent and eventual pre-warming of the first reaction material in the first process chamber A and/or of the fluid intended for compression in the third process chamber C until reaching a temperature above 80° C.

Once the warming of the first reaction material and/or of the fluid intended for compression has been obtained, the electronic control unit S operates means E for determining the discharge of the warming fluid from process chamber D.

For security reasons of the device according to the present invention, electronic control unit S operates means G for determining a temporary and selective communication of the first and third process chambers A and C and a consequent balancing of possible overpressure of the first reaction material or of the fluid intended for compression between said first and third process chambers A and C.

The invention claimed is:

1. A device for generating compressed fluids, the device comprising:
    a first process chamber A for containing and treating a first reaction material, the first process chamber A having an inlet that receives the first reaction material into the first process chamber A;
    a second process chamber B for containing and treating a second reaction material the second process chamber B having an inlet that receives the second reaction material into the second process chamber B;
    a third process chamber C, for containing and treating of a fluid designed to be compressed,
    wherein the first process chamber A, the second process chamber B, and the third process chamber C are each distinct sealed chambers separate from each other,
    wherein the first process chamber A is adjacent the third process chamber C and the second process chamber B is embedded within the third process chamber C;
    a nebulization pump (N) operatively connected to the first process chamber and to the second process chamber B, the nebulization pump (N) configured for nebulization of the first reaction material taken from the first process chamber and consequent entry of nebulized first reaction material into the second process chamber B; and
    a magnetron (M) arranged adjacent the third process chamber C, the magnetron (M) configured to provide an emission of radio waves with variable frequencies in a direction into said second process chamber B,
    wherein said radio waves, emitted by said magnetron (M) into the second process chamber B, interact with said nebulized first reaction material and the second reaction material, in solid form, contained in said second process chamber B, to thereby produce a high energy plasma that creates a temperature increase in the fluid contained in the third process chamber C to thereby warm-up and by being warmed-up compresses the fluid contained in the third process chamber C.

2. The device according to claim 1,
further comprising the first reaction material in the first process chamber A, wherein the first reaction material contained and treated in the first process chamber A is in liquid or gaseous form and is selected from the group consisting of water, fossil hydrocarbons, biologic hydrocarbons, and mixtures or emulsions comprising said water, fossil hydrocarbons, and biologic hydrocarbons.

3. The device according to claim 1, further comprising the second reaction material in the second process chamber B, wherein the second reaction material contained and treated in the second process chamber B comprises solid cluster material selected from the group consisting of copper, nickel, titanium, tungsten, iron, carbon, and compounds containing copper, nickel, titanium, tungsten, iron, or carbon.

4. The device according to claim 1, further comprising the fluid in the third process chamber C, wherein the fluid contained and treated is in the third process chamber C in gaseous form and is selected from the group consisting of atmospheric air, carbon dioxide, helium, nitrogen, and mixtures of atmospheric air, carbon dioxide, helium, and nitrogen.

5. The device according to claim 1, further comprising adjusting valves located at the inlet of the first process chamber A and at the inlet of the second process chamber B, said adjusting valves being operable to control entry of the first process material and the second process material respectively into the first process chamber A and the second process chamber B.

6. The device according to claim 1, further comprising an adjusting valve located at an outlet of the third process chamber, said adjusting valve being operable to control ejection of the compressed fluid from the outlet of the third process chamber C.

7. The device according to claim 1, further comprising: a fourth process chamber D for pre-heating the first process chamber A and the third process chamber C, the first process chamber A and the third process chamber C being enclosed in the fourth process chamber D.

8. The device according to claim 7, further comprising: adjusting valves at an inlet and an outlet of the fourth process chamber, the adjusting valves operable to control entry of a warming-up fluid into the fourth process chamber D and for ejection of said warming-up fluid from said chamber.

9. The device according to claim 8, wherein the warming-up fluid contained in the fourth process chamber D comprises fluids for thermal recovery in liquid or gaseous form.

10. The device according to claim 1, further comprising a balancing valve operatively connected to the first process chamber A and to the third process chamber C, the balancing valve being operable for balancing pressure between the first process chamber A and the third process chamber C for controlling overpressure of the first reaction material in the first process chamber A and controlling overpressure of the fluid in the third process chamber.

11. The device according to claim 1, further comprising an electronic control unit (S) for the coordinated management of the single elements of the device.

12. The device according to claim 1, further comprising the second reaction material in the second process chamber B, wherein the second reaction material contained and treated in the second process chamber B comprises solid powder material selected from the group consisting of copper, nickel, titanium, tungsten, iron, carbon, and powered compounds containing copper, nickel, titanium, tungsten, iron, or carbon.

13. The device according to claim 1, further comprising:
the first reaction material in the first process chamber A,
the second reaction material in the second process chamber B, and
the fluid in the third process chamber C,
wherein the first reaction material is in liquid or gaseous form and is selected from the group consisting of water, fossil hydrocarbons, biologic hydrocarbons, and mixtures or emulsions comprising said water, fossil hydrocarbons, and biologic hydrocarbons,
wherein the second reaction material comprises solid cluster or powder material selected from the group consisting of copper, nickel, titanium, tungsten, iron, carbon, and compounds containing copper, nickel, titanium, tungsten, iron, or carbon, and
wherein the fluid is in gaseous form and is selected from the group consisting of atmospheric air, carbon dioxide, helium, nitrogen, and mixtures of atmospheric air, carbon dioxide, helium, and nitrogen.

14. The device according to claim 13, wherein the second reaction material is in tablet form.

15. The device according to claim 13, further comprising:
first adjusting valves located at the inlet of the first process chamber A and at the inlet of the second process chamber B, said first adjusting valves being operable to control entry of the first process material and the second process material respectively into the first process chamber A and the second process chamber B;
a second adjusting valve located at an outlet of the third process chamber, said second adjusting valve being operable to control ejection of the compressed fluid from the outlet of the third process chamber C;
a fourth process chamber D for pre-heating the first process chamber A and the third process chamber C, the first process chamber A and the third process chamber C being enclosed in the fourth process chamber D;
third adjusting valves at an inlet and an outlet of the fourth process chamber, the third adjusting valves operable to control entry of a warming-up fluid into the fourth process chamber D and for ejection of said warming-up fluid from said chamber,
wherein the warming-up fluid contained in the fourth process chamber D comprises fluids for thermal recovery in liquid or gaseous form;
a balancing valve operatively connected to the first process chamber A and to the third process chamber C, the balancing valve being operable for balancing pressure between the first process chamber A and the third process chamber C for controlling overpressure of the first reaction material in the first process chamber A and controlling overpressure of the fluid in the third process chamber; and
an electronic control unit (S) operative connect to the first adjusting valves, the second adjusting valve, the third adjusting valves, and the balancing valve.

* * * * *